(12) United States Patent
Cho et al.

(10) Patent No.: US 7,251,209 B2
(45) Date of Patent: Jul. 31, 2007

(54) OPTICAL PICKUP AND A WEDGE BEAM SPLITTER

(75) Inventors: Yong-jun Cho, Gyeonggil-do (KR);
Pyong-yong Seong, Seoul (KR);
Seung-man Han, Gyeonggil-do (KR);
Hyun-seob Choi, Gyeonggi-do (KR);
Eun-goo Kim, Gyeonggi-do (KR);
Jong-koog Lee, Seoul (KR); Kun-soo Kim, Seoul (KR); Chun-gi Kim, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 526 days.

(21) Appl. No.: 10/424,821

(22) Filed: Apr. 29, 2003

(65) Prior Publication Data

US 2003/0202453 A1    Oct. 30, 2003

(30) Foreign Application Priority Data

Apr. 30, 2002  (KR) ............................ 2002-23724
Nov. 21, 2002  (KR) ..................... 10-2002-0072837

(51) Int. Cl.
*G11B 7/135* (2006.01)
(52) U.S. Cl. ............................ 369/112.24; 369/112.28
(58) Field of Classification Search ......... 369/112.245, 369/112.28
See application file for complete search history.

(56) References Cited

U.S. PATENT DOCUMENTS

| | | | | |
|---|---|---|---|---|
| 4,823,334 A | * | 4/1989 | Tanaka et al. | 369/44.23 |
| 5,978,148 A | * | 11/1999 | Oono et al. | 359/668 |
| 2001/0048063 A1 | * | 12/2001 | Yanagawa et al. | 250/205 |
| 2002/0060973 A1 | * | 5/2002 | Yamanouchi et al. | 369/112.23 |

FOREIGN PATENT DOCUMENTS

| | | |
|---|---|---|
| JP | 62-257641 | 11/1987 |
| JP | 05-266532 | 10/1993 |
| JP | 2001-023222 | 1/2001 |
| JP | 2001-043553 | 2/2001 |
| JP | 2002-100059 | 4/2002 |
| JP | 2002100059 A * | 4/2002 |
| JP | 2002-237086 | 8/2002 |

OTHER PUBLICATIONS

Korean Office Action issued in corresponding Korean Patent Application No. 10-2002-0072837, Aug. 27, 2004.
Office Action issued by the Japanese Patent Office on Dec. 21, 2004 during examination of the corresponding Japanese patent application.

* cited by examiner

*Primary Examiner*—Wayne Young
*Assistant Examiner*—Linh T. Nguyen
(74) *Attorney, Agent, or Firm*—Staas & Halsey LLP

(57) ABSTRACT

An optical pickup for a recording medium includes a light source, an objective lens, a main photodetector, and a front photodetector. The configuration of the optical pickup enables converging or diverging of light to be incident on a plate beam splitter so that light can be received at an effective light receiving region of a front photodetector without interference due to internal reflection occurring in the plate beam splitter. In the alternative, a wedge beam splitter in the optical pickup includes first and second mirror planes at a predetermined angle to transmit and reflect incident light at a predetermined ratio. In the optical pickup, an amount of light that is exactly proportional to an output power of the light source can be detected, where the output power of the light source can be accurately controlled, thereby improving a linearity of the output power of the light source.

12 Claims, 14 Drawing Sheets

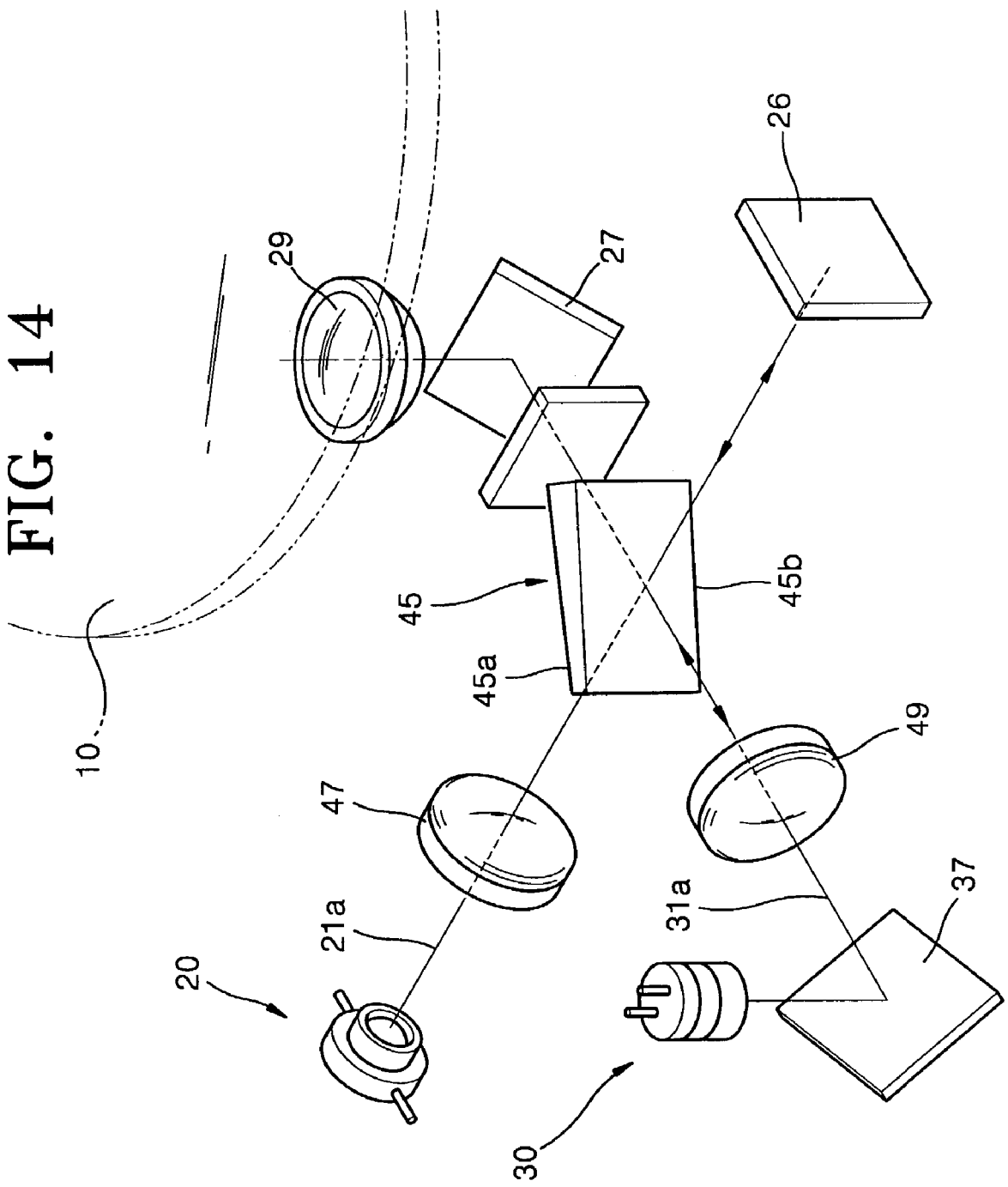

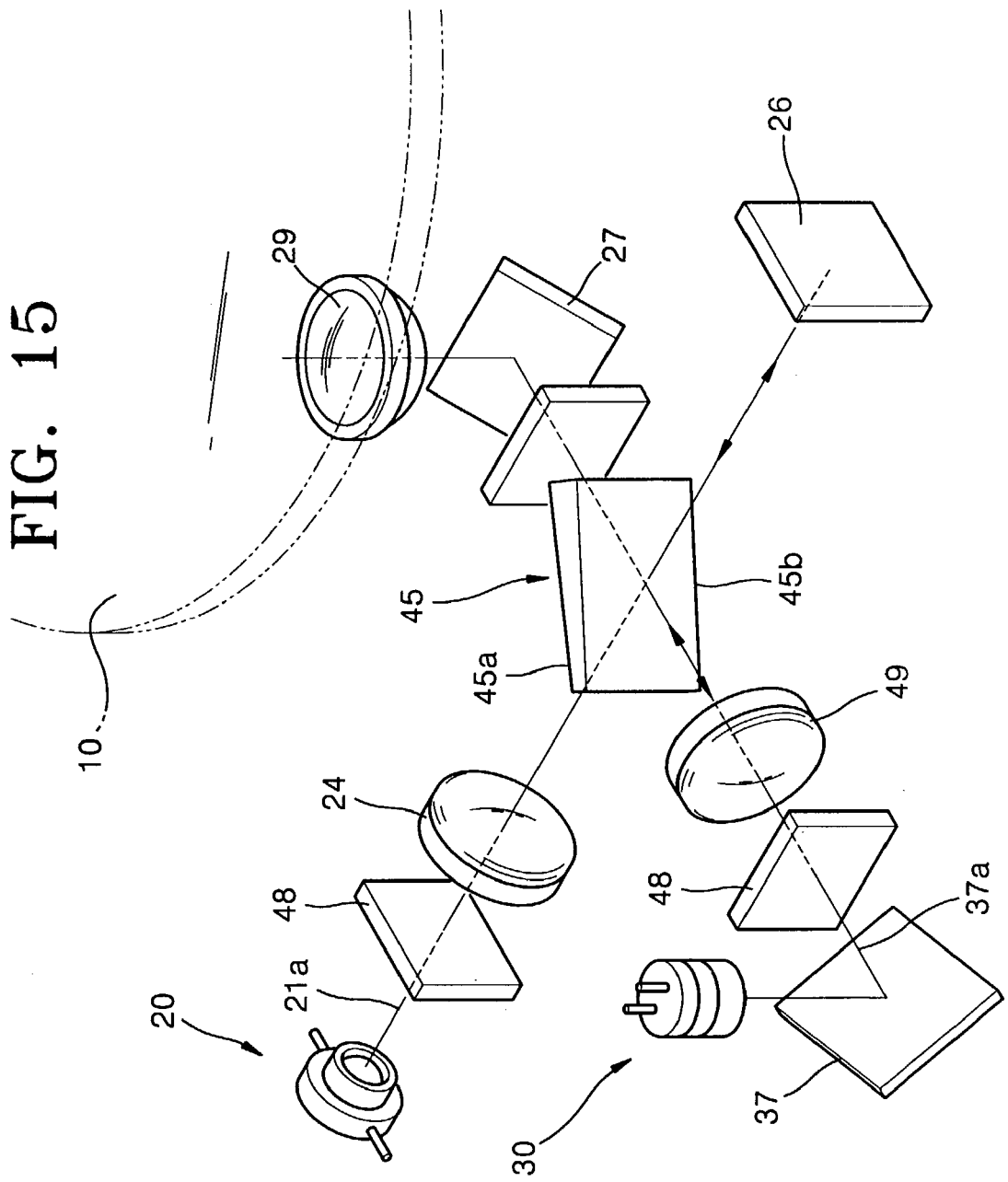

OPTICAL PICKUP AND A WEDGE BEAM SPLITTER

BACKGROUND OF THE INVENTION

CROSS-REFERENCE TO RELATED APPLICATIONS

This application claims the benefit of Korean Application Nos. 2002-23724, filed Apr. 30, 2002, and 2002-72837, filed Nov. 21, 2002 in the Korean Intellectual Property Office, the disclosure of which is incorporated herein by reference.

1. Field of the Invention

The present invention relates to an optical pickup having an optical configuration enabling the optical pickup to accurately control an output power of a light source, and a wedge beam splitter therefor.

2. Description of the Related Art

Optical pickups are used to record information on and/or to reproduce the information from recording media in a non-contact manner. Such optical pickups include an optical path changing device that directs light emitted from a light source towards a recording medium and directs the light reflected from the recording medium toward a photodetector. In general, cubic beam splitters or plate beam splitters are used as optical path changing devices.

The cubic beam splitters have a relatively large volume, where a sufficiently large degree of spatial freedom is not provided when used to construct a slim optical pickup system. Also, the cubic beam splitters are more expensive than the plate beam splitters.

Accordingly, when constructing slim and/or low-cost optical pickup optical systems, the plate beam splitter, which provides a large degree of spatial freedom and which is less costly than the cubic beam splitter is employed as the optical path changing device.

The optical pickups include a front photodetector (FPD) that detects a portion of the light emitted from the light source to accurately control a light output power in a recording operation. A signal detected by the FPD is used as an automatic power control (APC) signal. This APC signal is fed back to a light source power control drive to control the output power of the light source such that an optimal output power of the light for recording and/or reproduction can be emitted from the light source.

However, in the optical pickup having an optical configuration where diverging light emitted from the light source is changed into a parallel light by a collimating lens and enters the plate beam splitter, because the light emitted from the source and transmitted through or reflected by the plate beam splitter toward the FPD is parallel to the light internally reflected in the plate beam splitter toward the FPD, interference occurs. As a result, an amplitude of the APC signal detected by the FPD is not directly proportional to an intensity of the light emitted from the light source.

For example, referring to FIG. 1, when a parallel light beam 3 is incident on a plate beam splitter 1, a light beam 4 is transmitted through the plate beam splitter 1 and then a light beam 5 is internally reflected, sequentially, at a second mirror plane 1b and a first mirror plane 1b of the plate beam splitter 1. The light beams 4 and 5 travel parallel to one another and enter an effective light receiving region of a FPD, so that interference between the light beams 4 and 5 occurs. Accordingly, the amplitude of the APC signal, which is an electrical signal converted from a light signal received by the FPD, does not vary linearly with respect to a linearly varying output power of the light source. Therefore, it is impossible to accurately control the output power of the light source with the optical system using the plate beam splitter on which parallel light beams is incident.

When using the cubic beam splitter, the problem arising from the light interference when detecting the light to monitor the output power of the light source does not occur. However, the general cubic beam splitter used to change the paths of two light beams having different wavelengths leads to an insufficient amount of light having one of the two wavelengths being received by a light receiving unit. Also, the general cubic beam splitter cannot split the light having another wavelength at an appropriate ratio of an amount of reflected light toward the FPD, so that the amount of light for use to monitor the output power of the light source may be insufficient.

FIG. 2 is a comparative graph of transmittance for a conventional cubic beam splitter and an optical path changing device having ideal specifications, which are used to change travel paths of a red light used for a digital versatile disc (DVD) and an infrared light used for a compact disc (CD). In FIG. 2, solid lines denote transmittance curves of the conventional cubic beam splitter for an S-polarized light and a P-polarized light. In FIG. 2, dashed lines denote transmittance curves of the ideal optical path changing device for the S-polarized light and the P-polarized light that is required in the optical system in order not to cause insufficient amounts of light to be detected in the light receiving unit and in the FPD to monitor the output power of the light source. In FIG. 2, $\Delta\lambda 1$ denotes a range of wavelengths of the red light from about 645 nm to about 685 nm, and $\Delta\lambda 2$ denotes a range of wavelengths of infrared light from about 770 nm to about 810 nm.

In general, optical elements show a higher transmittance for the S-polarized light than for the P-polarized light due to associated coating properties. The optical elements also show the high transmittance in a general cubic beam splitter used to change the travel paths of the red light for DVDs and the infrared light for CDs.

Referring to FIG. 2, the conventional cubic beam splitter shows a high transmittance for the S-polarized light at about 50%, so an insufficient amount of light may be detected in the light receiving unit. The conventional cubic beam splitter shows a high transmittance for the P-polarized light in the wavelength range $\Delta\lambda 2$ at above 90%, so the amount of light that is insufficient to monitor the output power of the light source may be received in the FPD.

FIGS. 3A and 3B show the amount of light split in a general cubic beam splitter 5 having transmittance properties as shown in FIG. 2 for the incident light having different polarizations. In FIGS. 3A and 3B, the light having different wavelengths emitted from the light source is incident on a first plane 5A and a second plane 5B, among four planes 5a, 5b, 5c, and 5d of the cubic beam splitter 5. The third plane 5c faces an optical disc, and the fourth plane 5d faces the FPD.

The red light L1 incident on the first plane 5a is reflected from a mirror plane 5e of the cubic beam splitter 5 toward the optical disc. The infrared light L2 incident on the second plane 5b is transmitted through the mirror plane 5e of the cubic beam splitter 5 toward the optical disc. In considering that a semiconductor laser used as the light source for the optical pickup mostly emits a single linear polarized beam of light, an optical pickup system may be constructed such that the light emitted from the light source and the light reflected from the optical disc have different polarizations to minimize interference. In an example, a quarter wave plate is disposed between the cubic beam splitter and an objective lens so that the light emitted from the light source and the light reflected from the optical disc have polarizations orthogonal to each other.

In considering the transmittance curves of FIG. 2, the optical pickup system is constructed such that red light L1 for the DVDs is incident on the first plane 5a of the cubic beam splitter 5 and the infrared light L2 for the CDs is incident on the second plane 5b.

Referring to FIG. 3A, the general cubic beam splitter 5 reflects about 90% of the P-polarized red light L1 incident on the first plane 5a and transmits about 10% of the same. The cubic beam splitter 5 transmits and reflects about 50% of the S-polarized red light L1 reflected from the optical disc and incident thereon. Accordingly, about 10% of the incident red light L1 travels toward the FPD, so an amount of the red light L1 that is sufficient for light power monitoring can be received by the FPD. However, because only about 50% of the red light L1 reflected from the optical disc and incident on the cubic beam splitter 5 travels along the original optical path, an insufficient amount of the red light L1 may be received in the light receiving unit.

Referring to FIG. 3B, the general cubic beam splitter 5 transmits about 95% of the P-polarized infrared light L2 incident on the second plane 5b toward the optical disc and reflects about 5% of the same toward the FPD. The cubic beam splitter 5 transmits about 97% of the S-polarized infrared light L2 reflected from the optical disc and incident thereon and reflects about 3% of the same. Because about 97% of the infrared light L2 reflected from the optical disc and incident on the cubic beam splitter 5 travels along the initial optical path, a sufficient amount of the infrared light L2 can be received by the light receiving unit. However, because only 5% of the infrared light L2 travels towards the FPD, a sufficient amount of the infrared light L2 for light power monitoring cannot be received by the FPD. Thus, an amount of the infrared light L2 that is insufficient to monitor light power may be detected.

The reason why only 50% of the S-polarized red light is reflected by the cubic beam splitter is because light reflection has occurred in an optical glass having a larger refractive index than air. In the cubic beam splitter having such ideal specifications according to the polarization of incident light, providing the transmittance curves indicated as dashed lines in FIG. 2, can be implemented only when the arc angle of incident light with respect to the boundary of media formed of optical glass, where light reflection occurs, is within 30 degrees. However, as shown in FIGS. 3A and 3B, because the arc angle of the incident light for the cubic beam splitter 5 is 45 degrees, the general cubic beam splitter 5 does not satisfy the ideal specifications.

When the general plate beam splitter 1 having parallel two mirror planes 1a and 1b is used as the optical path changing device, as described above, it is impossible to accurately control the output power of the light source due to the problem of interference arising from the internal reflection in the plate beam splitter 1.

When the general cubic beam splitter 5 is used as the optical path changing device, the amount of light that is insufficient to monitor the output power may be detected in the light receiving unit. If the amount of light that is detected for the output power monitoring is insufficient, it is impossible to accurately control the output power of the light source.

SUMMARY OF THE INVENTION

Additional aspects and/or advantages of the invention will be set forth in part in the description which follows and, in part, will be obvious from the description, or may be learned by practice of the invention.

The present invention provides an optical pickup having an optical configuration to accurately control an output power of a light source, in which an amount of light can be detected by a front photodetector without interference due to internal reflection occurring in a plate beam splitter.

The present invention also provides a wedge beam splitter enabling a front photodetector to detect an amount of light without interference due to internal reflection when used in an optical pickup.

According to an aspect of the present invention, there is provided an optical pickup for a recording medium including: a light source emitting light; an objective lens focusing an incident light to form a light spot on the recording medium; a plate beam splitter transmitting and reflecting the incident light at a predetermined ratio; a main photodetector receiving the light reflected from a recording surface of the recording medium to detect information and/or an error signal; a front photodetector arranged at one side of the plate beam splitter and receiving the light transmitted through and/or reflected from the plate beam splitter to generate an automatic power control signal to control an output power of the light source; and a collimating lens arranged between the light source and the plate beam splitter and through which the light incident thereon becomes a converging or diverging light toward the plate beam splitter.

In one aspect of the present invention, the the light source includes first and second light sources emitting the light having different wavelengths, where the optical pickup is compatible with at least two types of recording media having different formats. The front photodetector may generate automatic power control signals to control an output power of the first and second light sources. In this case, the collimating lens may include a first collimating lens through which light emitted from the first light source toward the plate beam splitter becomes the converging or diverging light and/or a second collimating lens through which light emitted from the second light source toward the plate beam splitter becomes the converging or diverging light.

According to an aspect of the present invention, one of the first and second light sources emits the light having an infrared wavelength to record the information on and/or to reproduce the information from a CD family optical disc, and the other one of the first and second light sources emits light of a red wavelength to record the information on and/or to reproduce the information from a DVD family optical disc.

Denoting an incident angle of light on the collimating lens from the light source with respect to an optical axis as µ, an exit angle of light from the collimating-lens as µo, and a magnifying power of the collimating lens as m, the collimating lenses satisfy the following equation:

$$m = \mu/\mu o$$

$$0.018 \leq |m| \leq 0.056.$$

In this case, the light source emits the light having an infrared wavelength or light of a red wavelength to record the information on and/or to reproduce the information from a CD family optical disc and/or a DVD family optical disc.

According to aspect of the present invention, there is also provided an optical pickup for a recording medium, including: a light source emitting light; an objective lens focusing an incident light to form a light spot on the recording medium; a wedge beam splitter including first and second mirror planes at a predetermined angle and transmitting and reflecting the incident light at a predetermined ratio; a main photodetector receiving the light reflected from a recording surface of the recording medium to detect information and/or an error signal; and a front photodetector arranged at one side of the wedge beam splitter and receiving the light transmitted through and/or reflected from the wedge beam splitter to generate an automatic power control signal to control an output power of the light source.

In the optical pickup, the light source may include first and second light sources emitting the light having different wavelengths, where the optical pickup is compatible with at least two types of recording media having different formats. The front photodetector generates automatic power control signals to control the output power of the first and second light sources.

According to another aspect of the present invention, there is provided a wedge beam splitter including first and second mirror planes at a predetermined angle A to transmit and reflect incident light at a predetermined ratio, the predetermined angle A between the first and second mirror satisfying the following equation:

$$0.3° \leq |A| \leq 3.0°.$$

According to an aspect of the present invention, there is provided a wedge beam splitter including first and second mirror planes to transmit and reflect incident light at a predetermined ratio, wherein the first mirror plane transmits and reflects the incident light at the predetermined ratio and has a reflectance greater than 50% for an S-polarized red light and an internal reflectance greater than 5% for a P-polarized infrared light.

BRIEF DESCRIPTION OF THE DRAWINGS

These and other objects and advantages of the invention will become apparent and more readily appreciated from the following description of the aspects of the present invention, taken in conjunction with the accompanying drawings of which:

FIG. 14 shows the optical configuration of the optical pickup, according to the third aspect of the present invention;

FIG. 15 shows the optical configuration of the optical pickup, according to a fourth aspect of the present invention.

DETAILED DESCRIPTION OF THE INVENTION

Figure 1:
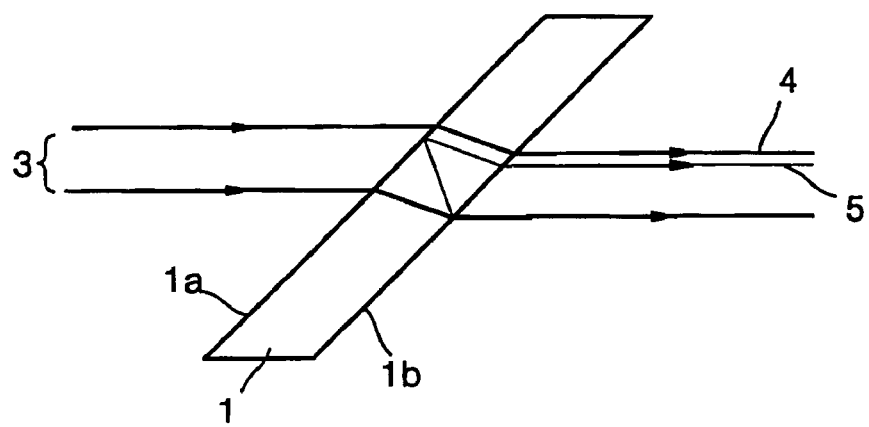
FIG. 1 shows paths of light transmitted through a plate beam splitter and the light internally reflected at least twice in the plate beam splitter when an incident light on the plate beam splitter is a parallel light.

Reference will now be made in detail to the embodiments of the present invention, examples of which are illustrated in the accompanying drawings, wherein like reference numerals refer to like elements throughout. The embodiments are described below in order to explain the present invention by referring to the figures.

In an optical configuration of an optical pickup, according to a first aspect of the present invention, the optical pickup includes two light sources emitting light of different wavelengths and a plate beam splitter, and at least one collimating lens is disposed such that the light emitted from at least one of the two light sources travels towards the plate beam splitter as converging or diverging the light. Accordingly, an amount of light that is proportional to a light power of the light source can be detected without being affected by interference due to an internal reflection of the flat beam splitter.

Figure 4:
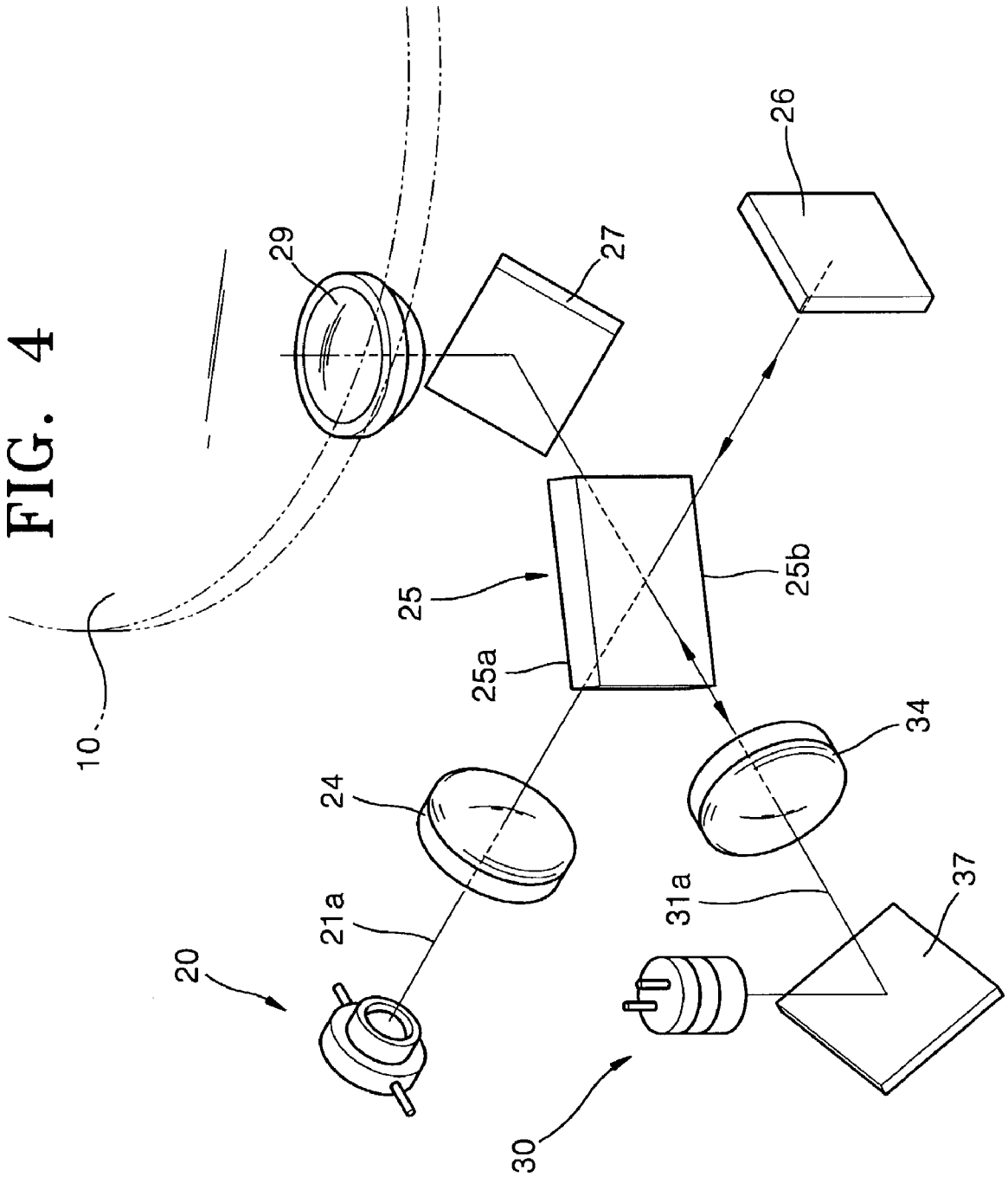
FIG. 4 shows an optical configuration of an optical pickup, according to a first aspect of the present invention.
Figure 5:
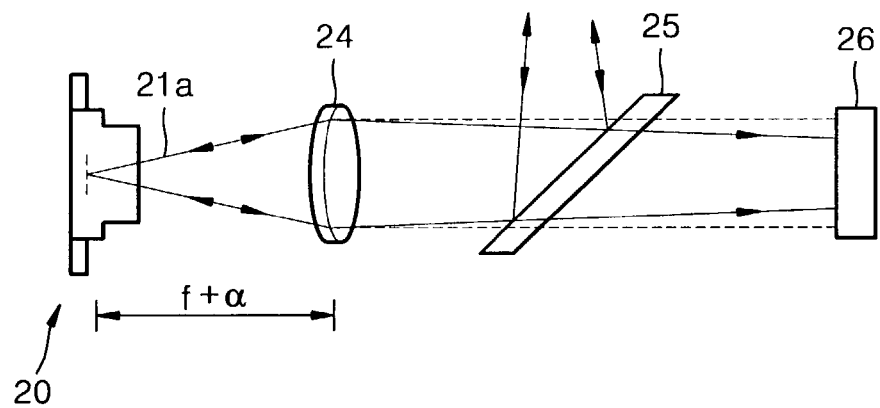
FIG. 5 shows an optical arrangement to change a first light beam incident from a first hologram light module of FIG. 4 into a slightly converging light beam by a first collimating lens.

FIG. 4 shows an example of the optical configuration of the optical pickup, according to the first aspect of the present invention. FIG. 5 shows an optical arrangement for changing a first light beam 21a incident from a first hologram light module 20 into a slightly converging light beam by a first collimating lens 24.

Referring to FIGS. 4 and 5, the optical pickup, according to the first aspect of the present invention, is compatible with at least two types of optical media having different formats, for example, a low density optical disc and a high density optical disc. The optical pickup, according to the first aspect of the present invention, includes first and second hologram light modules 20 and 30, an objective lens 29 which focuses an incident light to form a light spot on a recording surface of a recording medium 10, a plate beam splitter 25 which transmits and reflects the incident light at a predetermined ratio, first and second collimating lenses 24 and 34 which are disposed between the plate beam splitter 25 and the respective first and second hologram light modules 20 and 30, and a front photodetector 26 which detects a signal for controlling the output power of the light emitted from the first hologram light module 20. In FIG. 4, reference numerals 27 and 37 denote reflection mirrors. The reflection mirrors 27 and 37 may be removed from the optical pickup, according to the first aspect of the present invention, depending on the type of optical recording and/or reproducing apparatus to which the optical pickup is applied.

Figure 6:
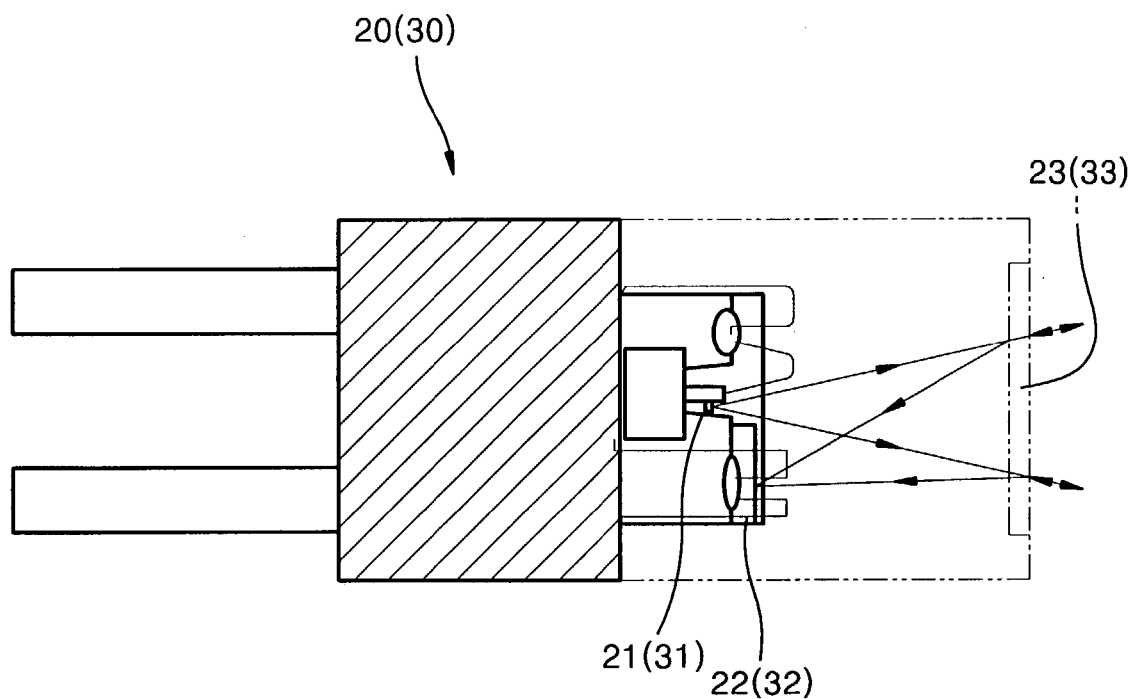
FIG. 6 shows a detailed example of a hologram light module of the optical pickup shown in FIG. 4.

The first hologram light module 20, as shown in FIG. 6, is a result of combining a first light source 21, which emits the light having a predetermined wavelength suitable for recording information on and/or reproducing the information from the high density optical disc, a first hologram element 23, and a first main photodetector 22. The second hologram light module 30, as shown in FIG. 6, is a result of combining a second light source 31 which emits the light having a different wavelength from the first light source 21 and which is suitable for recording the information on and/or reproducing the information from the low density optical disc, a second hologram element 33, and a second main photodetector 32.

When the optical pickup, according to the first aspect of the present invention, is compatible with a CD family optical disc and a DVD family optical disc, the first light source 21 is designed to emit a first light beam 21a in a range of red wavelengths, for instance, of about 645 nm to 685 nm, and specifically, 650 nm, and the second light source 31 is designed to emit a second light beam 1a in a range of infrared wavelengths, for instance, of about 770 nm to 810 nm, and specifically, 780 nm. Semiconductor lasers may be used as the first and second light sources 21 and 31.

When the optical pickup, according to the first aspect of the present invention is compatible with a DVD family optical disc and a next generation DVD family optical disc, the first light source 21 is designed to emit the first light beam 21a in a range of red wavelengths, and the second light source 31 is designed to emit a second light beam 31a in a range of blue wavelengths.

The first and second hologram elements 23 and 33 acting as the optical path changing devices directly transmit the first and second light beams 31a and 31a emitted from the first and second light sources 21 and 31, respectively, and diffract the first and second light beams 21a and 31a that are reflected back from the recording media 10 toward the first and second hologram light modules 20 and 30, into $+1^{st}$ order or $-1^{st}$ order diffracted light beams so that the light beams are received by the first and second main photodetectors 22 and 32, respectively.

The first and second main photodetectors 22 and 32 receive the first and second light beams 21a and 31a, respectively, reflected from the recording media 10 and processed via the objective lens 29 and the plate beam splitter 25 and detect information signals and/or error signals from the received first and second light beams 21a and 31a.

The optical pickup, according to the first aspect of the present invention, may include other types of optical path changing devices, such as cubic beam splitters or plate beam splitters to change travel paths of the first and second light beams 21a and 31a, respectively, instead of the first and second hologram elements 23 and 33. In this case, the first and second photodetectors 22 and 32 are arranged separate from the first and second light sources 21 and 31, respectively.

In the optical pickup, according to the first aspect of the present invention, when the front photodetector 26 is used to control an intensity of recording light incident on the high density optical disc, for example, the DVD family optical disc, the first collimating lens 24 is arranged to change the first light beam 21a emitted from the first light source 21 into almost a parallel, slightly converging or diverging light.

In comparison with a case of changing the diverging light into the parallel light through the first collimating lens 24, when the first collimating lens 24 is arranged close to or away from the first light source 21, the first light beam 21a incident on the first collimating lens 24 can be changed into the slightly converging or diverging light through the first collimating lens 24.

FIG. 5 shows an example where the first collimating lens 24 is arranged at a distance that is longer than a focal length f of the first collimating lens 24 by a predetermined value α, i.e., f+α, from the first light source 21 so that the first light beam 21a, incident on the first collimating lens 24 from the first light source 21, is changed into the slightly converging light.

In the optical pickup, according to the first aspect of the present invention, an incident angle of the first light beam 21a on the first collimating lens 24 from the first light source 21 with respect to an optical axis is denoted as μ, an exit angle of the first light beam 21a from the first collimating lens 24 with respect to the optical axis is denoted as μo, and a magnifying power of the first collimating lens 24 is denoted as m. According to an aspect of the present invention, the first collimating lens 24 satisfies the following equation (1).

$$m=\mu/\mu o$$

$$0.018 \leq |m| \leq 0.056 \qquad (1)$$

When the magnifying power m is greater than 0, the first light beam 21a passed through the first collimating lens 24 is slightly divergent. When the magnifying power m is smaller than 0, the first light beam 21a passed through the first collimating lens 24 is slightly convergent.

As described above, when the first light beam 21a emitted from the first light source 21 as the diverging light is changed into almost parallel, slightly converging or diverging light by the first collimating lens 24, the amount of light can be detected by the front photodetector 26 without (internal) interference between first light beam 21a, which is emitted from the first light source 21 and transmitted through the plate beam splitter 25 toward the front photodetector 26, and a light beam which is internally reflected in the plate beam splitter 25 toward the front photodetector 26.

Figure 7:
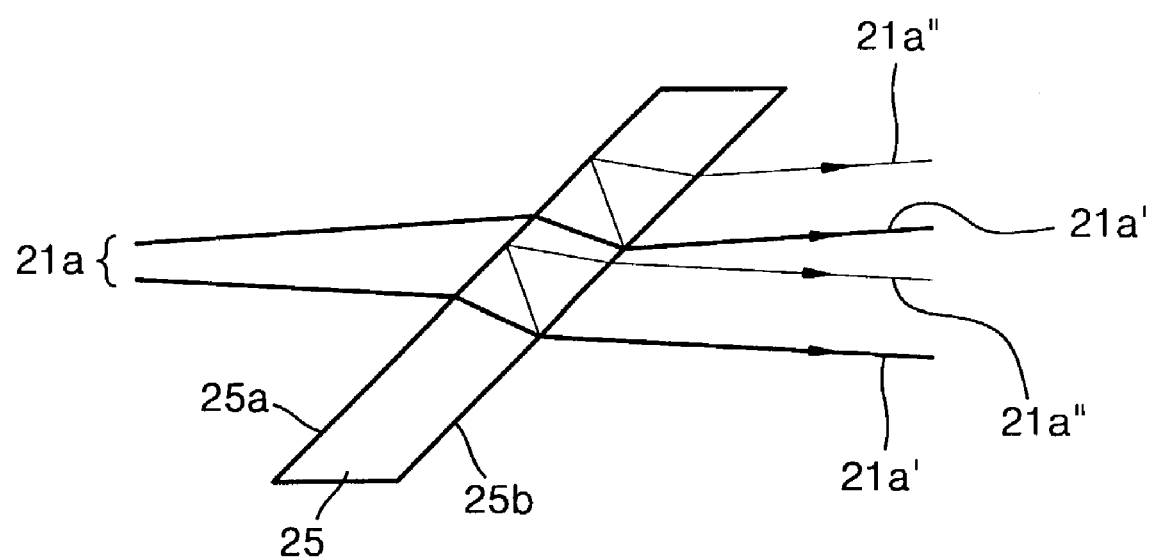
FIG. 7 shows paths of light transmitted through a plate beam splitter and the light internally reflected at least twice in the plate beam splitter when the light incident on the plate beam splitter through a collimating lens is slightly divergent, where the collimating lens is arranged a distance shorter than an associated focal length from a light source in the optical pickup, according to the first aspect of the present invention.

For example, a distance between the first collimating lens 24 and the first light source 21 is shorter than the focal length f of the first collimating lens 24 so that the first light beam 21a transmitted through the first collimating lens 24 toward the plate beam splitter 25 is slightly divergent, as shown in FIG. 7. Further, the front photodetector 26 receives the light incident from the first light source 21 and transmitted through the first collimating lens 24, a light beam 21a' transmitted through the plate beam splitter 25 toward the front photodetector 26, and a light beam 21a" internally reflected at least twice in the plate beam splitter 25 toward the front photodetector 26, where the light beams 21a' and 21a" are not parallel to each other. Accordingly, the light beams 21a' and 21a" do not interfere with one another in an effective light receiving region of the front photodetector 26.

Figure 12:
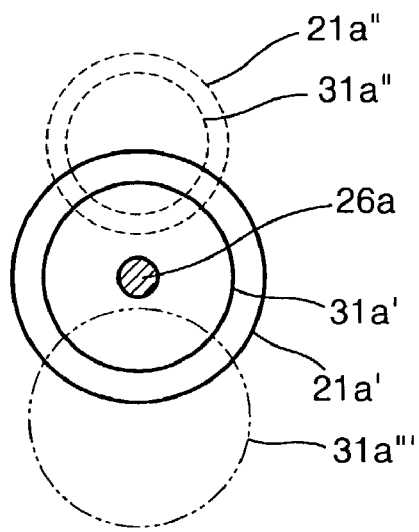
FIG. 12 shows that no interference occurs between the first and second light beams transmitted through and reflected from the wedge beam splitter toward a front photodetector, as shown in FIG. 11, in an effective light receiving region of the front photodetector.

Because an area of the effective light receiving region of the front photodetector 26 is smaller than a size of the first light beam 21a, the front photodetector 26 can be arranged such that an associated effective light receiving region is positioned to avoid causing an interference between the first light beams 21a' and 21a", as shown in FIG. 12 described later. As a result, an amount of light that is proportional to the output power of the first light source 21 can be detected by the first photodetector 25 without an influence of interference due to the internal reflection.

Therefore, when using the optical pickup, according to the first aspect of the present invention, an automatic power control (APC) signal of which amplitude is exactly proportional to the output power of the light emitted from the first light source 21, can be generated by the front photodetector 26. By feeding the generated APC signal back to a driver for the first light source 21 to control the output power of the first light source 21, the first light source 21 can emit recording power having linearity. Therefore, when recording data on a high density optical disc, for example, the DVD family optical disc, it is possible to control the output power of the first light source 21 to ensure that the recording light is incident on the optical disc with a desired intensity.

In particular, when the parallel light is incident on the plate beam splitter 1, as shown in FIG. 1, the light reflected from or transmitted through the plate beam splitter 1 toward a front photodetector and light internally reflected in the plate beam splitter 1 toward the front photodetector undergo interference with one another, so that there is a problem in the linearity of the recording power. However, as in the optical pickup, according to the first aspect of the present invention described with reference to FIGS. 4 through 7, when the collimating lens is arranged to change the diverging light emitted from the light source and incident thereon into slightly diverging or converging light, the linearity of the recording power can be improved, so that the power of the recording light can be accurately controlled in a recording operation.

The second collimating lens 34 may be arranged to change, for example, the second light beam 31a emitted from the second light source 31 as a diverging light into a parallel light.

Alternatively, the first collimating lens 24 may be arranged to change the first light beam 21a incident thereon as the diverging light from the first light source 21 into the parallel light. The second collimating lens 34 is arranged to change the second light beam 31a incident thereon as the diverging light from the second light source 31 into a slightly diverging or converging light. In this case, the front photodetector 26 is used to control the output power of the second light source 31.

Alternatively, the first and second collimating lenses 24 and 34 may be arranged to change both the first and second light beams 21a and 31a incident thereon as the diverging light from the first and second light sources 21 and 31 into the slightly diverging or converging light, respectively. In this case, the front photodetector 26 is used to control the output power of both of the first and second light sources 21 and 31.

The plate beam splitter 25 includes a first mirror plane 25a that transmits and reflects the first light beam 21a incident thereon from the first light source 21 of the first hologram light module 20 at a predetermined ratio, and a second mirror plane 25b opposite to the first mirror plane 25a. The first mirror plane 25a reflects most of the first light beam 21a incident from the first light source 21 toward the recording media 10 and transmits a portion of the first light beam 21a toward the front photodetector 26. The plate beam splitter 25 transmits most of the second light beam 31a incident thereon from the second light source 311 of the second hologram light module 30 toward the recording media 10 and internally reflects a portion of the second light beam 31a at the first mirror plane 25a toward the front photodetector 26.

The second mirror plane 25b of the plate beam splitter 25 may be coated so as not to reflect the first and/or second light beams 21a and 31a. When the second mirror plane 25b is coated so as not to reflect the first light beam 21a, an amount of the first light beam 21a that is internally reflected in the plate beam splitter 25 can be reduced. When the second mirror plane 25b is coated so as not to reflect the second light beam 31a, a transmittance of the second light beam 31a at the second mirror plane 25b can be increased, thereby increasing a light efficiency. In this case, the second light beam 31a emitted from the second light source 31, transmitted through the second mirror plane 25b, and internally reflected once at the first mirror plane 25a is received as the effective light by the front photodetector 26.

The travelling of the first and second light beams 21a and 31a emitted from the first and second hologram light modules 20 and 30 in the optical pickup, according to the first aspect of the present invention, having the optical configuration as shown in FIG. 4 will be described with reference to a case where the front photodetector 26 is used to control the output power of both, the first and second light sources 21 and 31 to record the information on and/or to reproduce the information from the high density optical disc, for example, the DVD family optical disc and the low density optical disc, for example, the CD family optical disc, respectively.

When the DVD family optical disc is adopted as the recording medium 10, the first light source 21 is operated to emit the first light beam 21a as the diverging light. The emitted first light beam 21a is directly transmitted through the first hologram element 23, changed into the slightly converging or diverging light while being transmitted through the first collimating lens 24, and incident on the plate beam splitter 25. Most of the first light beam 21a incident on the plate beam splitter 25 is reflected at the first mirror plane 25a, toward the objective lens 29. A portion of the first light beam 21a is transmitted through the first mirror plane 25a of the plate beam splitter 25. The first light beam 21a incident on the objective lens 29 is focused as the light spot on the recording surface of the recording medium 10 by the objective lens 29. The first light beam 21a reflected from the recording surface of the recording medium 10 is incident on the first hologram element 23 of the first hologram light module 20 along the optical path opposite to the above, diffracted while being transmitted through the first hologram element 23, and received by the first main photodetector 22.

Most of the first light beam 21a transmitted through the first mirror plane 25a of the plate beam splitter 25 is transmitted through the second mirror plane 25*b* of the plate beam splitter 25 toward the front photodetector 26. The portion of the first light beam 21*a* is internally reflected at the second mirror plane 25*b* and then at the first mirror plane 25*a* and transmitted through the second mirror plane 25*b* toward the front photodetector 26. At this time, because the light beam 21'*a*, the portion of the first light beam 21*a* transmitted through the first mirror plane 25*a* to enter the plate beam splitter 25 and directly transmitted through the second mirror plane 25*b* without an internal reflection in the plate beam splitter 25, is not parallel to the light beam 21*a*" internally reflected at least twice and transmitted through the second mirror plane 25*b*, only the first light beam 21*a*' can be received by an effective light receiving region of the front photodetector 26. Accordingly, the amount of light can be detected without being affected by interference between the light beams 21*a*' and 21*a*".

Therefore, the APC signal of which an amplitude is almost exactly proportional to the output power of the first light source 21, is generated by the front photodetector 26. The output power of the first light source 21 can be accurately controlled to ensure that the recording light is on the DVD family optical disc with a desired intensity, using the APC signal generated by the front photodetector 26.

When the CD family optical disc is adopted as the recording medium 10, the second light source 31 is operated to emit the second light beam 31*a* as the diverging light. The emitted second light beam 31*a* is directly transmitted through the second hologram element 33, changed into the slightly converging or diverging light while being transmitted through the second collimating lens 34, and incident on the plate beam splitter 25. Most of the second light beam 31*a* incident on the plate beam splitter 25 is sequentially transmitted through the second and first mirror planes 25*b* and 25*a* of the plate beam splitter 25 toward the objective lens 29. A portion of the second light beam 31*a* is internally reflected at the second mirror plane 25*b* and then, at the first mirror plane 25*a* and transmitted through the second mirror plane 25*b* toward the front photodetector 26. The second light beam 31*a* incident on the objective lens 29 is focused as the light spot on the recording surface of the recording medium 10 by the objective lens 29. The second light beam 31*a* reflected from the recording surface of the recording medium 10 is incident on the second hologram element 33 of the second hologram light module 30 along an optical path opposite to the above, diffracted while being transmitted through the second hologram element 33, and received by the second main photodetector 32.

Most of the second light beam 31*a*, which is internally reflected once at the first mirror plane 25*a* of the plate beam splitter 25, is transmitted through the second mirror plane 25*b* of the plate beam splitter 25 toward the front photodetector 26. A portion of the second light beam 31*a* is internally reflected at the second mirror plane 25*b* and then, at the first mirror plane 25*a* and transmitted through the second mirror plane 25*b* toward the front photodetector 26. At this time, because the second light beam internally reflected once and transmitted through the second mirror plane 25*b* is not parallel to the portion of the second light beam that is internally reflected at least three times and transmitted through the second mirror plane 25*b*, only the portion of the second light beam 31*a* that has been internally reflected once can be received by the effective light receiving region of the front photodetector 26. Accordingly, the amount of light can be detected without being affected by interference.

Therefore, the APC signal of which amplitude is almost exactly proportional to the output power of the second light source 31, is generated by the front photodetector 26. The output power of the second light source 31 can be accurately controlled to ensure that the recording light is incident on the CD family optical disc with the desired intensity, using the APC signal generated by the front photodetector 26.

The optical arrangement of the optical pickup, according to the first aspect of the present invention, may be changed such that the first light beam 21*a* emitted from the first light source 21 is transmitted through the plate beam splitter 25 toward the objective lens 19, and the second light beam 31*a* emitted from the second light source 31 is reflected by the plate beam splitter 25 toward the objective lens 19.

Figure 8A:
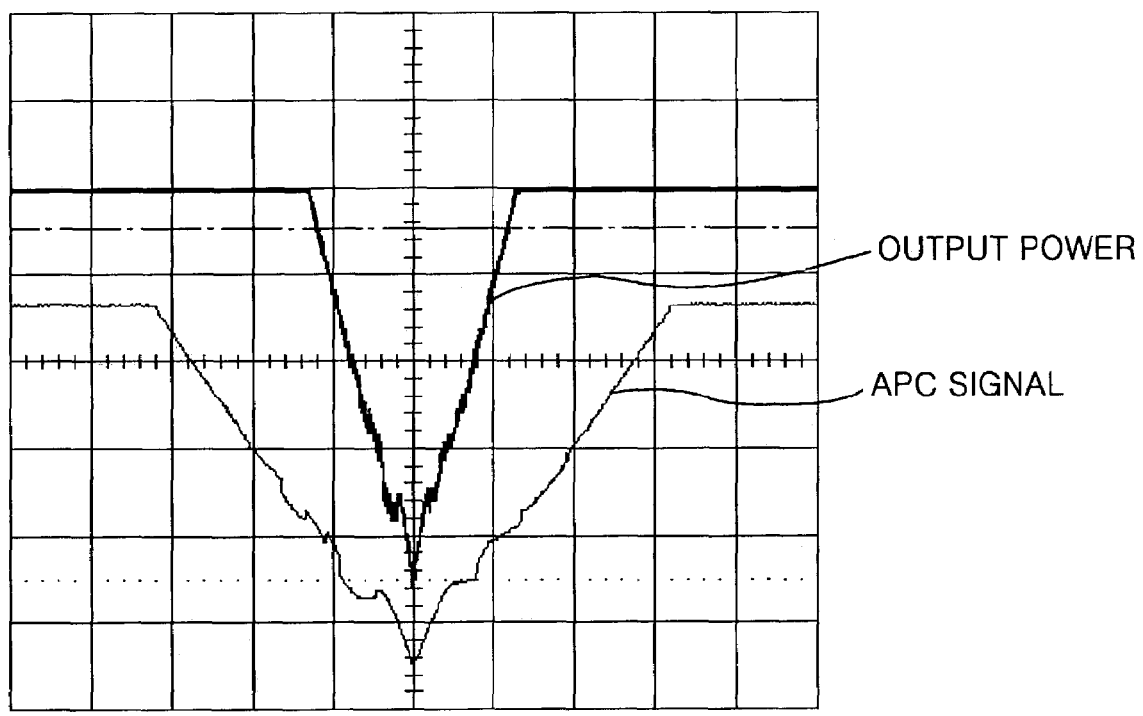
FIG. 8A is a graph illustrating a detection signal, which is an automatic power control (APC) signal of a front photodetector when an output power of the light source is varied from 0 mW to 40 mW as a triangular pulse of 3 Hz in a conventional optical pickup, where the light transmitted through the collimating lens is parallel.
Figure 8B:
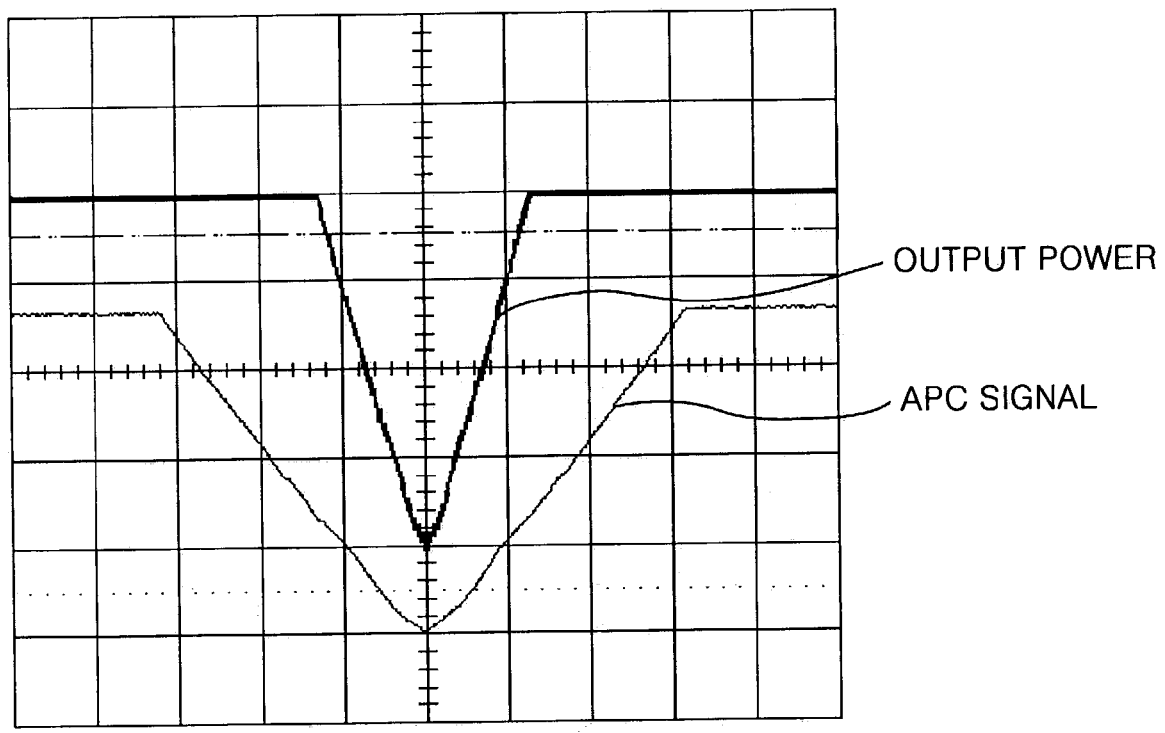
FIG. 8B is a graph illustrating a detection signal, i.e., APC signal of the front photodetector when the output power of the light source is varied from 0 mW to 40 mW as the triangular pulse of 3 Hz in the optical pickup, according to the first aspect of the present invention, where the light transmitted through the collimating lens is slightly diverging or converging.

FIGS. 8A and 8B show that a linearity of the output power of the light can be improved by using the optical pickup, according to the first aspect of the present invention. FIG. 8A is a graph illustrating a detection signal (APC signal) of the front photodetector 26 when the output power of the light source is varied from 0 mW to 40 mW as a triangular pulse of 3 Hz in a conventional optical pickup, where the light transmitted through the collimating lens is parallel. FIG. 8B is a graph illustrating a detection signal (APC signal) of the front photodetector 26 when the output power of the light source is varied from 0 mW to 40 mW as a triangular pulse of 3 Hz in the optical pickup, according to the first aspect of the present invention, where the light transmitted through the collimating lens is slightly diverging or converging. The results shown in FIG. 8A are obtained by disposing the collimating lens 10.8 mm, an associate focal length, away from the light source. The results shown in FIG. 8B are obtained by disposing the collimating lens of 0.4 mm more than the associated 10.8 mm-focal length away from the light source.

As shown in FIG. 8A, when the focal length of the collimating lens is arranged separate from the light source so that parallel light is incident on the plate beam splitter, the amplitude of the APC signal detected by the front photodetector 26 is not linearly proportional to the output power of the light source which is linearly varied.

However, as is apparent from FIG. 8B, when using the optical pickup, according to the first aspect of the present invention, the amplitude of the APC signal detected by the front photodetector 26 is linearly proportional to the output power of the light source, which is linearly varied. Therefore, by using an optical pickup, according to the first aspect of the present invention, the linearity of the output power of the light source can be greatly improved.

The optical pickup, according to a second aspect of the present invention, may have an optical configuration where a single light source is used, and slightly diverging or converging light is incident on the plate beam splitter.

Figure 9:
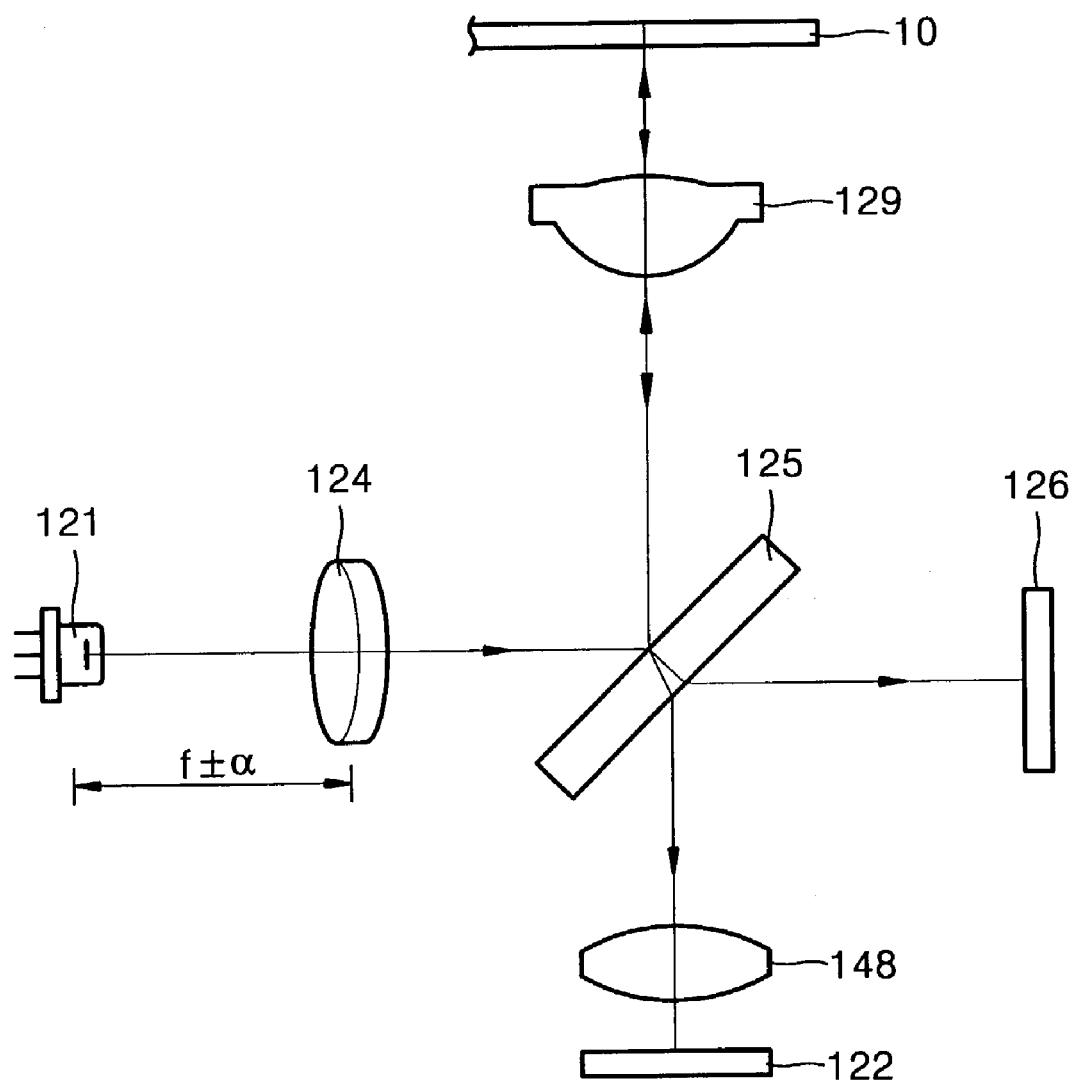
FIG. 9 shows an optical configuration of the optical pickup, according to a second aspect of the present invention.

FIG. 9 shows an example of the optical configuration of the optical pickup, according to the second aspect of the present invention. Referring to FIG. 9, the optical pickup according to the second aspect of the present invention, corresponding to the first aspect of the present invention but using the single light source, includes a single light source 121, a collimating lens 124, a plate beam splitter 125, an objective lens 129, a main photodetector 122, and a front photodetector 126. In FIG. 9, reference numeral 148 denotes a sensing lens that condenses the light reflected from the recording medium toward the main photodetector 122 so that the light is received by the main photodetector 122. In the optical arrangement shown in FIG. 9 the reflecting mirrors 27 and 37 shown in FIG. 4 are eliminated.

In the optical pickup, according to the second aspect of the present invention, the collimating lens 124 changes the light emitted from the light source 121 as the diverging light into the slightly converging or diverging light.

Denoting the focal length of the collimating lens 124 as f, when the distance between the collimating lens 124 and the light source 121 is set to be longer than or shorter than the focal length f of the collimating lens 124 by a predetermined value $\alpha$, i.e., f±$\alpha$, the light emitted from the light source 121 can be changed into slightly converging or diverging light by the collimating lens 124. The plate beam splitter 125 reflects most of the light incident from the light source 121 toward the objective lens 129 and transmits a portion of the incident light toward the front photodetector 126. The plate beam splitter 125 transmits the light reflected back from the recording medium 11 toward the main photodetector 122. The main photodetector 122 receives the light reflected back from the recording medium 10 and transmitted through the objective lens 129 and the plate beam splitter 125. The main photodetector 122 detects the information signal and/or the error signal from the received light.

In the optical pickup, according to the second aspect of the present invention, the light source 121, the collimating lens 124, the objective lens 129, and the main photodetector 122 provide the same or similar functions as the first light source 21, the first collimating lens 24, the objective lens 29, and the main photodetector 22, respectively, of the optical pickup, according to the first aspect of the present invention. Therefore, descriptions thereon will not be repeated here. It will be appreciated that in the second aspect of the present invention, the light source 121 may be designed to emit the light including an infrared, red, or other wavelength suitable to record the data on and/or reproduce the data from the CD family optical disc and/or the DVD family optical disc.

The optical pickup, according to the present invention as described above, can be used exclusively for the CD family optical discs or the DVD family optical discs or can be compatible with CD and DVD family optical discs. Because a technique of using the single light source in a compatible optical pickup is widely known in the field, a detailed description thereon will be omitted.

In the optical pickup, according to the second aspect of the present invention as illustrated in FIG. 9, the principles of improving the linearity of the output power of the light source 121 are substantially the same as those described in the first aspect. Thus, a detailed description thereon will be omitted.

Hereinafter, the optical pickup including a wedge beam splitter, according to an aspect of the present invention will be described.

Figure 10:
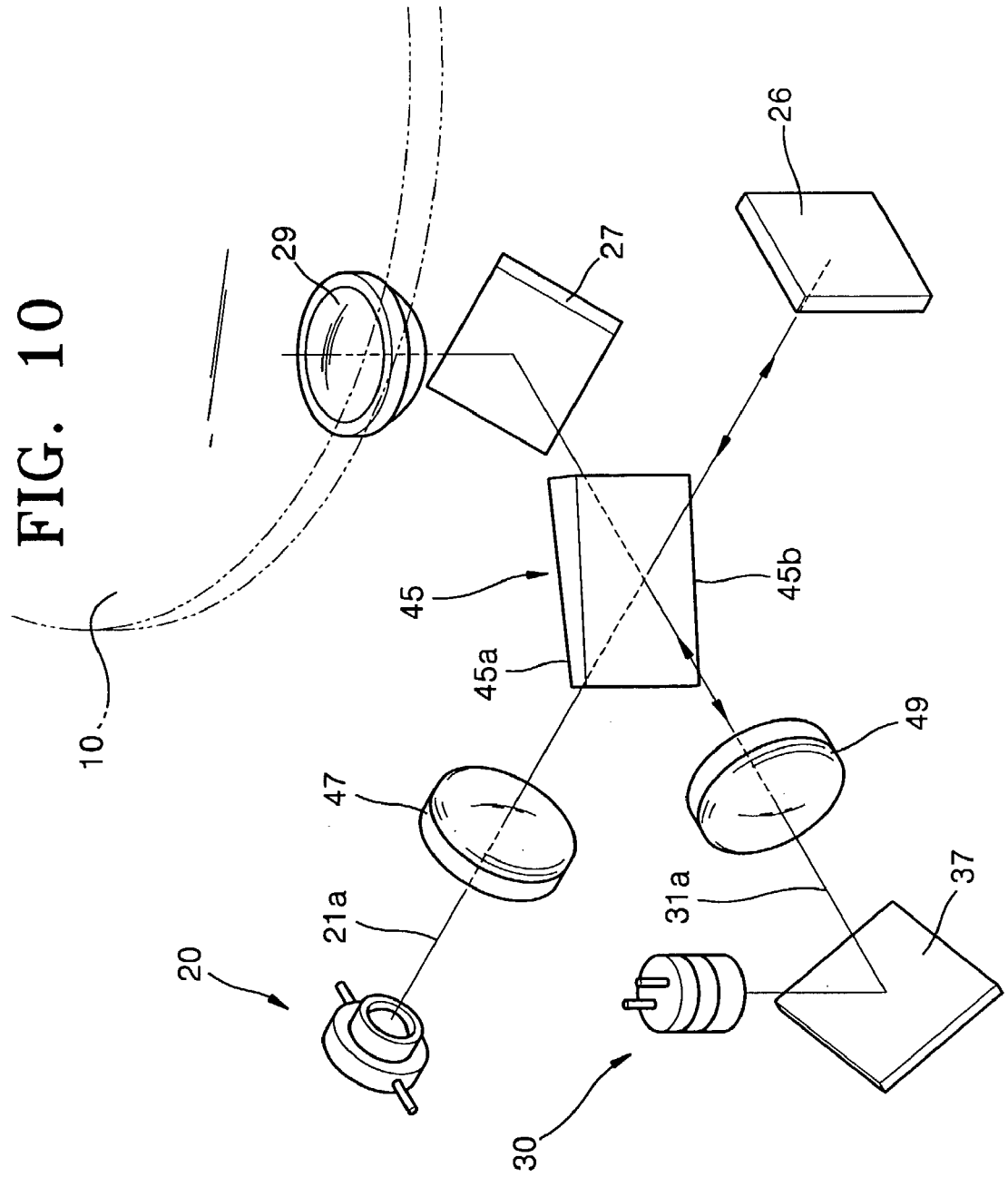
FIG. 10 shows the optical configuration of the optical pickup, according to a third aspect of the present invention.

Like the optical pickup, according to the first aspect of the present invention, the optical pickup according to a third aspect of the present invention, as shown in FIG. 10, has an optical configuration compatible with the low density optical disc and the high density optical disc. The optical pickup includes two light sources emitting light having different wavelengths and a wedge beam splitter enabling detection of an amount of light proportional to the optical power of the light source without being affected by interference due to internal reflection.

FIG. 10 shows an example of the optical configuration of an optical pickup, according to the third aspect of the present invention, compatible with the low density optical disc and the high density optical disc, like the optical pickup according to the first aspect of the present invention. In the optical pickup, according to the third aspect of the present invention, a wedge beam splitter 45, according to the present invention, is used instead of the plate beam splitter 25 used in the first aspect according to the present invention. The wedge beam splitter 45 has two mirror planes 45a and 45b at a predetermined angle. In FIG. 10, elements having the same or similar functions as those of FIG. 4 are denoted by the same reference numerals as used in FIG. 4, and descriptions thereon are omitted here.

Referring to FIG. 10, the optical pickup, according to the third aspect of the present invention, includes the first and second hologram light modules 20 and 30, the objective lens 29 that focuses the incident light to form the light spot on the recording medium 10, a wedge beam splitter 45 that transmits and reflects the incident light at a predetermined ratio, and the front photodetector 26 that receives the light emitted from the first light source 21 of the first hologram light module 20 and transmitted through the wedge beam splitter 45. The front photodetector 26 detects the signal used for controlling the output power of the first light source 21. The optical pickup, according to the third aspect of the present invention, may further include first and second collimating lenses 47 and 49 in optical paths between the wedge beam splitter 45 and the respective first and second hologram light modules 20 and 30. In this case, the first and/or second collimating lenses 47 and 49 are arranged such that first and second light beams 21a and 31a, emitted from the respective first and second light sources 21 and 31 as diverging light, can be changed into parallel light beams.

The wedge beam splitter 45, according to the present invention, includes a second mirror plane 45b slanted with respect to the first mirror plane 45 so that the first and second light beams 21a and 31a transmitted through the wedge beam splitter 45 toward the recording medium 10 are parallel to one another. The second hologram light module 30 and the second collimating lens 49 are arranged, as shown in FIG. 13B described later, such that an incident angle of the second light beam 31a on the second mirror plane 45b of the wedge beam splitter 45 is different from an incident angle of the first light beam 21a on the first mirror plane 45a.

In order to prevent interference in an effective receiving region (26a of FIG. 12) of the front photodetector 26 due to an internal reflection occurring at least twice at the first and/or second mirror planes 45a and 45b of the wedge beam splitter 45, an wedge angle A between the first and second mirror planes 45a and 45b, i.e., at which the second mirror plane 45b is slanted with respect to the first mirror plane 45a, satisfies the following condition of equation (2).

$$0.3° \leq |A| \leq 3.0°$$  (2)

Factors which determine the wedge angle A include an area of the effective light receiving region 26a of the front photodetector 26, a distance between the wedge beam splitter 45 and the front photodetector 26, a light travelling direction after primary and secondary internal reflection has occurred at the first and/or second mirror planes 45a and 45b of the wedge beam splitter 45, a manufacturing error in the wedge angle A and thickness of the wedge beam splitter 45, the travelling direction of an internally reflected light that is affected by an optical system assembly error, a deviation of optical axes of the optical paths between the first and second light sources 21 and 31 and the front photodetector 26 due to a difference in the wavelength of the first and second light beams 21a and 31a, an influence of shapes of the light beams that vary while being transmitted through the wedge beam splitter 45, etc.

Figure 11:
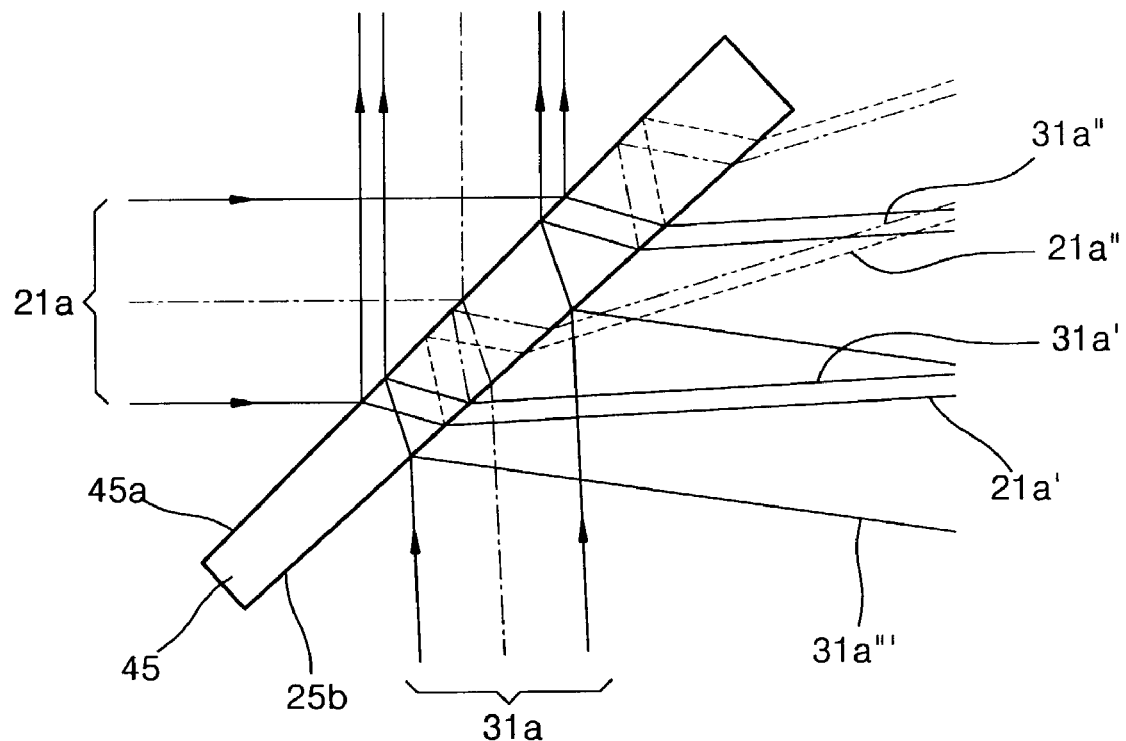
FIG. 11 shows paths of first and second light beams transmitted through and reflected from a wedge beam splitter, according to an aspect of the present invention.

When using the two mirror planes 45a and 45b of the wedge beam splitter 25 at a predetermined angle as described above, as shown in FIG. 11, a first light beam 21a', which is emitted from the first light source 21 and transmitted through the wedge beam splitter 45 toward the front photodetector 26 and a second light beam 21a", which is internally reflected at least twice in the wedge beam splitter 45 toward the front photodetector 26 are not parallel to each other. Therefore, as shown in FIG. 12, third and fourth light beams 31a' and 31a" do not interfere with one another in the effective light receiving region 26a of the front photodetector 26, so that the output power of the first light source 21 can be accurately controlled.

When using the two mirror planes 45a and 45b of the wedge beam splitter 25 are at a predetermined angle as described above, as shown in FIG. 11, a fifth light beam 31a''', which is emitted from the second light source 31 and transmitted through the wedge beam splitter 45 toward the front photodetector 26, and the fourth light beam 31a", which is internally reflected at least three times in the wedge beam splitter 45 toward the front photodetector 26, are not parallel to each other. Therefore, as shown in FIG. 12, the first and second light beams 21a' and 21a" do not interfere with one another in the effective light receiving region 26a of the front photodetector 26. When the second light beam 31a is incident on the wedge beam splitter 45, a portion of the second light beam 31a may be reflected at the second mirror plane 45b. However, because the reflected portion of the second light beam 31a is not parallel to the third and fourth light beams 31a' and 31a", no interference occurs in the effective light receiving region 26a of the front photodetector 26. Accordingly, the output power of the second light source 31 can be accurately controlled.

The first mirror plane 45a acts to transmit and reflect incident light at a predetermined ratio. In the wedge beam splitter 45, according to an aspect of the present invention, the first mirror plane 45 may have a reflectance greater than 50% for S-polarized red light and an internal reflectance greater than 5% for P-polarized infrared light. For instance, the wedge beam splitter 45 may be formed to have ideal transmittance properties for the first light beam 21a which is red light used for DVDs, and the second light beam 31a, which is an infrared light used for CDs, as shown in FIG. 2.

The wedge beam splitter 45 reflects, for example, the first light beam 21a, in the air, thereby advantageously maximizing a reflectance of the S-polarized component of the first light beam 21a. In particular, according to the wedge beam splitter 45, because the first light beam 21a reflected back from the optical disc 10 is reflected at the first mirror plane 45a that is exposed to the air, the reflectance of the S-polarized component of the first light beam 21a can be increased, compared to a conventional cubic beam splitters.

Also, according to the wedge beam splitter 45, the portion of the second light beam 31a incident on the wedge beam splitter 45 from the second light source 31 is internally reflected at the first mirror plane 45a and directed toward the front photodetector 26. The reflectance of the P-polarized component of the second light beam 31a at the first mirror plane 45a can be increased compared to conventional cubic beam splitters.

Figure 2:
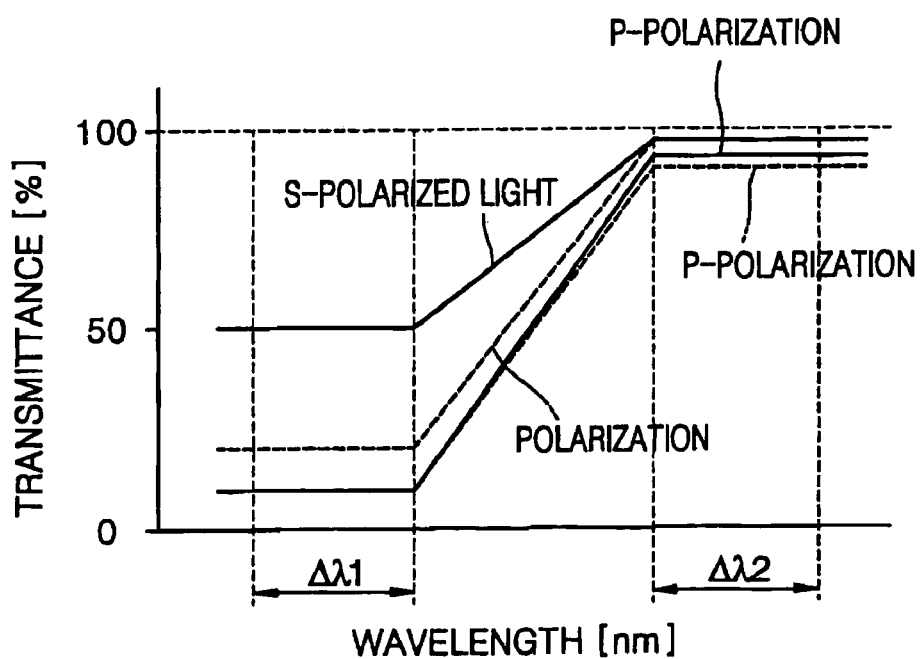
FIG. 2 is a comparative graph of a transmittance of a conventional cubic beam splitter and an optical path changing device having ideal specifications, which are used to change travel paths of a red light used for a digital versatile disc (DVD) and an infrared light used for a compact disc (CD)
Figure 3A:
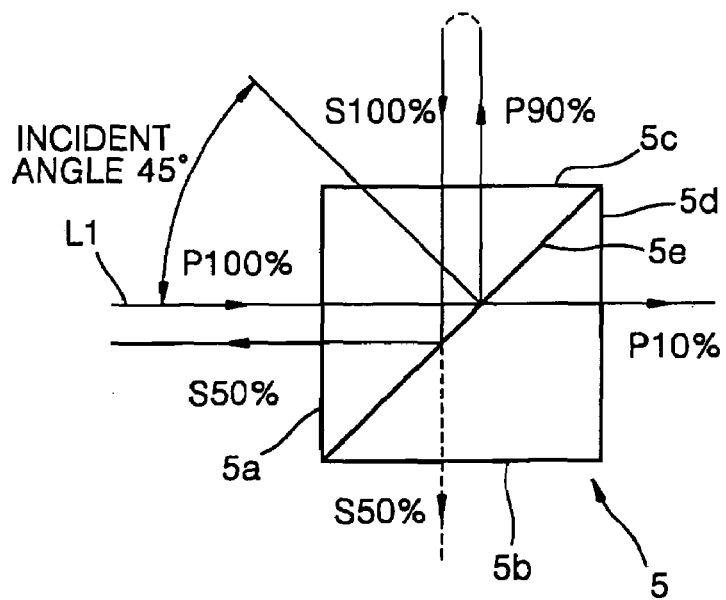
FIGS. 3A and 3B show an amount of light split by the cubic beam splitter having transmittance properties as shown in FIG. 2 for the incident light having different polarizations.
Figure 3B:
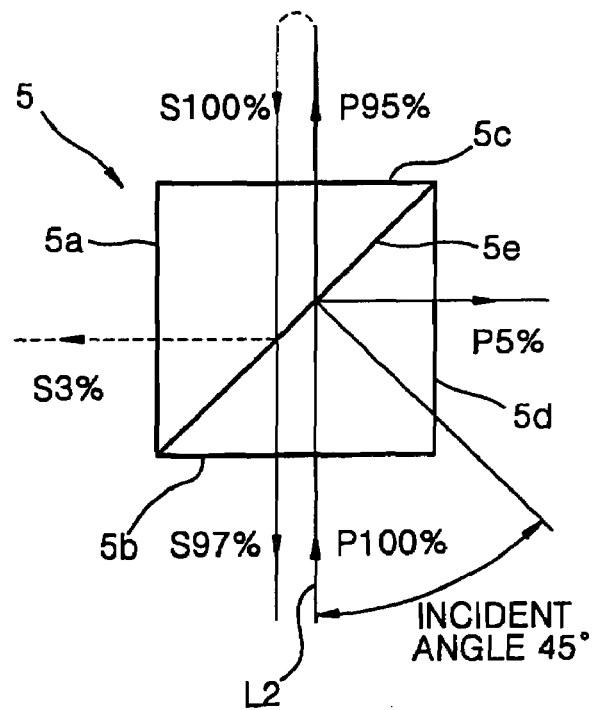

Therefore, the wedge beam splitter 45, according to an aspect of the present invention, is formed with the first mirror plane 45a having a reflectance greater than 50% for S-polarized red light and an internal reflectance greater than 5% for P-polarized infrared light, and to satisfy the ideal transmittance specifications indicated as dashed lines in FIG. 2. It will be appreciated that the plate beam splitter 25 used in the optical pickup, according to the first aspect of the present invention, may be formed to satisfy the ideal transmittance specifications indicated as dashed lines in FIG. 2.

Figure 13A:
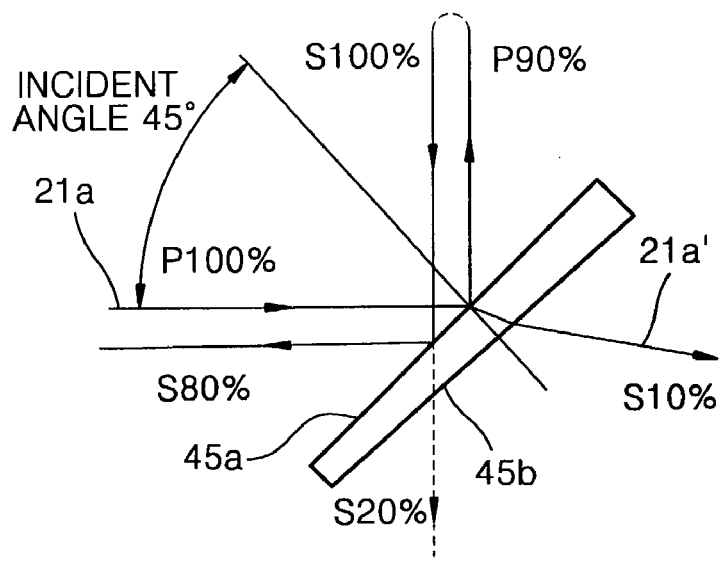
FIGS. 13A and 13B shows an amount of light split by the wedge beam splitter, according to an aspect of the present invention, formed to satisfy ideal transmission specifications indicated as dashed lines in FIG. 2, for an incident light of different polarizations.
Figure 13B:
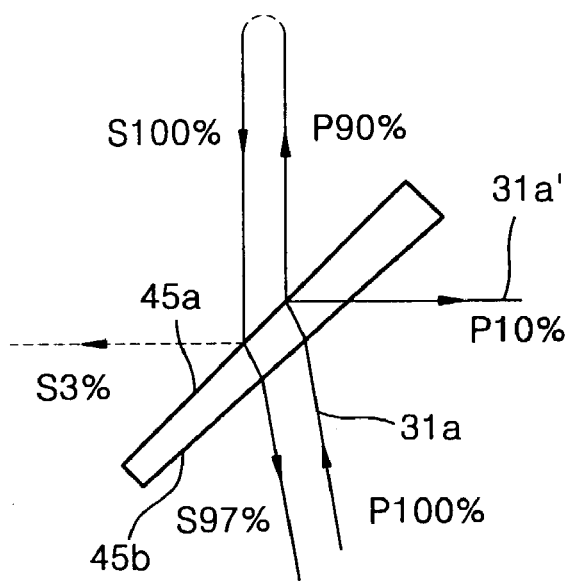

When the wedge beam splitter 45, according to an aspect of the present invention, is formed to satisfy the ideal transmittance specifications, the wedge beam splitter 45 splits the amount of the first and second light beams 21a and 31a, as shown in FIGS. 13A and 13B.

A reason the reflectance of the S-polarized component of the first light beam 21a and the P-polarized component of the second light beam 31a can be increased when using the wedge beam splitter, compared to using conventional cubic beam splitters, is because the first mirror plane 45 is in contact with air and a medium of the wedge beam splitter 45 has a great difference in refractive index from the air medium.

FIGS. 13A and 13B show an amount of light split by the wedge beam splitter 45 according to an aspect of the present invention, formed to satisfy the ideal transmission specifications indicated as dashed lines in FIG. 2, for incident light of different polarizations.

Referring to FIG. 13A, the wedge beam splitter 45 reflects at the first mirror plane 45a about 90% of the P-polarized component of the first light beam 21a incident on the first mirror plane 45a at an angle of 45 degrees toward the recording medium 10 and transmits about 10% of the same toward the front photodetector 26. The wedge beam splitter 45 reflects at the first mirror plane 45a about 80% of the S-polarized component of the first light beam 21a reflected from the recording medium 10 and incident thereon, toward a light receiving unit. The light receiving unit may include, for example, the first main photodetector 22 of the first hologram module 20. As a result, a sufficient amount of the first light beam 21a can be detected by the light receiving unit, so no problem arises from an insufficient amount of light being received by the light receiving unit.

Referring to FIG. 13B, the wedge beam splitter 45 transmits about 90% of the second light beam 31a which is refracted and transmitted through the second mirror plane 45b and incident on the first mirror plane 45a through its first mirror plane 45a toward the recording medium 10 and reflects about 10% of the same toward the front photodetector 26. The wedge beam splitter 45 transmits about 97% of the S-polarized component of the second light beam 31a reflected from the recording medium 10 and incident thereon. Accordingly, a sufficient amount of the second light beam 31a can be detected by the light receiving unit, for example, the second main photodetector 32 of the second hologram module 30. In addition, because about 10% of the second light beam 31a is directed toward the front photodetector 26, an amount of the second light beam 31a that is sufficient for monitoring the output power of the second light source 31 can be received by the front photodetector 26, so no problem arises from the insufficient amount of light for monitoring the output power of light.

As described above, the wedge beam splitter 45, according to an aspect of the present invention, is formed having transmission and reflection properties that do not cause an insufficient amount of the first light beam 21a of a red wavelength and the second light beam 21a of an infrared wavelength to be detected by the light receiving unit and by the front photodetector 26.

Therefore, in an optical pickup, according to the third aspect of the present invention as described above, due to the wedge structure of the wedge beam splitter 45, the light can be detected by the front photodetector 26 without being affected by interference due to the internal reflection occurring in the wedge beam splitter 45. Accordingly, the linearity of recording light power can be greatly improved, as in the optical pickup, according to the first aspect of the present invention.

When the wedge beam splitter 45, according to an aspect of the present invention, is manufactured to have such transmission and reflection properties as above, insufficient amounts of light are not detected by the light receiving unit and by the front photodetector 26.

When the wedge beam splitter 45 is formed to have transmission properties as described above with respect to the polarization of incident light, the optical pickup, according to an aspect of the present invention, may be constructed to have an optical configuration, as shown in FIGS. 14 and 15, in which the first and/or second light beams 21a and 31a incident on the wedge beam splitter 45 from the first and/or second light sources 21 and 31, respectively, have a P-polarization. A quarter wave plate 46 is further disposed in the optical path between the wedge beam splitter 45 and the objective lens 29 to change the polarization of the first and/or second light beams 21a and 31a.

FIG. 14 shows an example of using a semiconductor laser emitting P-polarized light as the first and/or second light sources 21 and 31 in order for the first and/or second light beams 21a and 31a of the P-polarization to be incident on the wedge beam splitter 45. When a semiconductor laser emitting S-polarized light is used as the first and/or second light sources 21 and 31, as shown in FIG. 15, a half wave plate 48 that changes the S-polarized light into P-polarized light may be further disposed between the first and/or second light sources 21 and 31 and the wedge beam splitter 45.

The optical pickups according to the fourth and fifth aspects of the present invention shown in FIGS. 14 and 15 have an optical configuration in which the quarter wave plate 46 and/or the half wave plate 48 are further arranged in the optical pickup according to the third aspect of the present invention shown in FIG. 10.

In the optical pickups according to the third, fourth, and fifth aspects of the present invention described above, the front photodetector 26 can be used to control the output power of both or one of the first and second light sources 21 and 31.

Like the optical pickup, according to the first aspect of the present invention described above, the optical pickups according to the third, fourth, and fifth aspects of the present invention may be variously changed.

Figure 16:
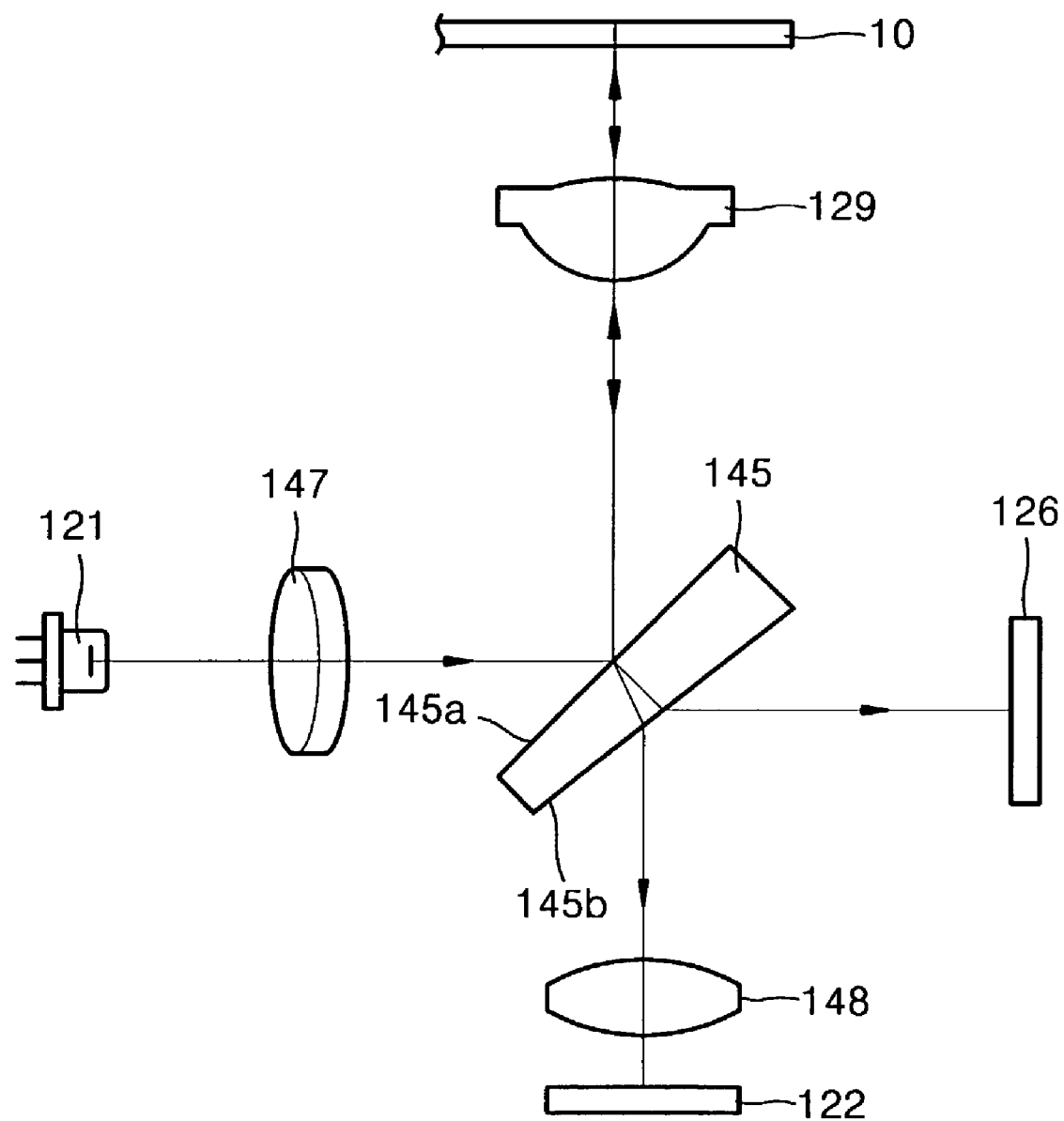
FIG. 16 shows the optical configuration of the optical pickup, according to a fifth of the present invention.

The optical pickup, according to an aspect of the present invention includes a wedge beam splitter may have an optical configuration including a single light source, as shown in FIG. 16, instead of including two light sources as illustrated in FIGS. 10, 14, and 15.

Referring to FIG. 16, the optical pickup according to a sixth aspect of the present invention, having a configuration corresponding to the third aspect of the present invention shown in FIG. 10 but including a single light source, includes a single light source 121, a wedge beam splitter 145, an objective lens 129, a main photodetector 122, and a front photodetector 126. The optical pickup according to the sixth aspect of the present invention may further include a collimating lens 147 between the single light source 121 and the wedge beam splitter 125.

As in the optical pickup according to the third aspect of the present invention, the wedge beam splitter 145 used in the optical pickup, according to the sixth aspect of the present invention, has the wedge structure with first and second mirror planes 145 and 145b at a predetermined angle, which are not parallel to each other. For example, the wedge beam splitter 145 reflects most of light incident from the light source 121 toward the objective lens 129 and transmits a portion of the same toward the front photodetector 126. The wedge beam splitter 145 transmits the light reflected back from the recording medium 10 toward the main photodetector 122. The main photodetector 122 receives the light reflected from the recording medium 10 and transmitted through the objective lens 129 and the wedge beam splitter 145 and detects the information signal and/or the error signal from the received light.

A sensing lens 148 condenses the light transmitted through the wedge beam splitter 145 such that the light can be received by the main photodetector 122.

In the optical pickup, according to the sixth aspect of the present invention, the light source 121, the collimating lens 147, the objective lens 129, and the main photodetector 122 provide the same or similar functions as the first light source 21, the first collimating lens 24, the objective lens 29, and the first main photodetector 22 of the optical pickup, respectively, according to the third aspect of the present invention. Therefore, descriptions thereon will not be repeated here. A person of ordinary skill in the art will appreciate that the light source 121 may be designed to emit the light of an infrared, red, or other wavelength suitable to record the data on and/or reproduce the data from the CD family optical disc and/or the DVD family optical disc, as in the second aspect according to the present invention.

The optical pickup, according to the sixth aspect of the present invention as described above, can be used exclusively for the CD family optical discs or the DVD family optical discs or can be compatible with the CD and DVD family optical discs.

In the optical pickup, according to the sixth aspect of the present invention as illustrated in FIG. 16, the principles of improving the linearity of the output power of the light source 121 are substantially the same as the principles of improving the linearity of the output power of the first light source 21 in the optical pickup of the third aspect of the present invention.

An optical pickup according to an aspect of the present invention, may have the optical configuration including the single light source as in FIG. 16. The optical pickup includes a wedge beam splitter formed to satisfy reflection and transmission properties that do not cause an insufficient amount of light to be detected by the light receiving unit, i.e., the main photodetector 122 and by the front photodetector 126 with respect to the polarization of incident light as in the fourth and fifth aspects of the present invention. The quarter wave plate, and the optional half wave plate may be used as the light source depending on the polarization of light emitted from the semiconductor laser. The optical pickup having the above configuration optical configuration can be inferred sufficiently from the forgoing aspects, and thus an illustration and detailed description thereon will be omitted here.

Although in the forgoing aspects the optical pickups according to the present invention are illustrated and described as being compatible with the CD family and the DVD family optical discs, the present invention is not limited to this structure. In other words, the optical pickup according to an aspect of the present invention, may be used to be compatible with the DVD family optical discs and the next-generation DVD family optical discs.

In addition, the optical configuration of an optical pickup including the wedge beam splitter 45, according to an aspect of the present invention, may be variously changed.

Although in the above the wedge beam splitter 45, according to an aspect of the present invention, is illustrated and described as being applied to the optical pickup, the wedge beam splitter 45 may be applied to other optical devices if necessary.

In an optical pickup, according to an aspect of the present invention, having the above optical configuration where converging or diverging light is incident on a plate beam splitter, light can be received at an effective light receiving region of the front photodetector without interference due to internal reflection occurring in the plate beam splitter.

In an optical pickup including a wedge beam splitter, according to an aspect of the present invention, light can be received at an effective light receiving region of the front photodetector without interference due to internal reflection occurring in the wedge beam splitter.

Therefore, in an optical pickup according to an aspect of the present invention, an amount of light that is exactly proportional to the output power of a light source can be detected, so that an output power of the light source can be accurately controlled, thereby greatly improving the linearity of the output power of the light source.

A wedge beam splitter, according to an aspect of the present invention may be formed to have an optimal reflectance and transmittance. When this wedge beam splitter is applied to an optical pickup, advantageously it can be prevented that an insufficient amount of light is detected by a light receiving region and by a front photodetector used to monitor an output power of the light source, which would occur when using conventional cubic beam splitters.

Although a few aspects of the present invention have been shown and described, it would be appreciated by those skilled in the art that changes may be made in this embodiment without departing from the principles and spirit of the invention, the scope of which is defined in the claims and their equivalents.

What is claimed is:

1. An optical pickup for a recording medium comprising:
a light source emitting light;
an objective lens focusing an incident light to form a light spot on the recording medium;
a plate beam splitter transmitting and reflecting the incident light at a predetermined ratio;
a main photodetector receiving the light reflected from a recording surface of the recording medium to detect information and/or an error signal;
a front photodetector arranged at one side of the plate beam splitter and receiving the light transmitted through and/or reflected from the plate beam splitter to generate an automatic power control signal to control an output power of the light source; and
a collimating lens arranged between the light source and the plate beam splitter and through which the light incident thereon becomes a converging or diverging light toward the plate beam splitter,
wherein denoting an incident angle of light on the collimating lens from the light source with respect to an optical axis as $\mu$, an exit angle of light from the collimating lens as $\mu o$, and a magnifying cower of the collimating lens as m, the collimating lens satisfies the following equation:

$$m=\mu/\mu o$$

$$0.018 \leq |m| \leq 0.056.$$

2. An optical pickup for a recording medium comprising:
a light source emitting light;
an objective lens focusing an incident light to form a light spot on the recording medium;
a plate beam splitter transmitting and reflecting the incident light at a predetermined ratio;
a main photodetector receiving the light reflected from a recording surface of the recording medium to detect information and/or an error signal;
a front photodetector arranged at one side of the plate beam splitter and receiving the light transmitted through and/or reflected from the plate beam splitter to generate an automatic power control signal to control an output power of the light source; and
a collimating lens arranged between the light source and the plate beam splitter and through which the light incident thereon becomes a converging or diverging light toward the plate beam splitter,
wherein the light source comprises first and second light sources emitting the light having different wavelengths, where the optical pickup is compatible with at least two types of recording media having different formats,
wherein the collimating lens comprises a first collimating lens through which light emitted from the first light source toward the plate beam splitter becomes the converging or diverging light and/or a second collimating lens through which light emitted from the second light source toward the plate beam splitter becomes the converging or diverging light, and
wherein denoting an incident angle of light on the first and/or second collimating lenses from the first and/or second light sources with respect to an optical axis as $\mu$, an exit angle of light from the first and/or second collimating lenses as $\mu o$, and a magnifying power of the first and/or second collimating lenses as m, the first and/or second collimating lenses satisfy the following equation:

$$m=\mu/\mu o$$

$$0.018 \leq |m| \leq 0.056.$$

3. The optical pickup of claim 2, wherein the front photodetector generates automatic power control signals to control an output power of the first and second light sources.

4. The optical pickup of claim 1,
wherein the light source comprises first and second light sources emitting the light having different wavelengths, and
wherein the collimating lens comprises a first collimating lens through which light emitted from the first light source toward the plate beam splitter becomes the converging or diverging light and/or a second collimating lens through which light emitted from the second light source toward the plate beam splitter becomes the converging or diverging light.

5. The optical pickup of claim 4, wherein one of the first and second light sources emits light having an infrared wavelength to record the information on and/or to reproduce the information from a CD family optical disc, and the other one of the first and second light sources emits light having a red wavelength to record the information on and/or to reproduce the information from a DVD family optical disc.

6. The optical pickup of claim 1, wherein the front photodetector generates automatic power control signals to control an output power of the first and second light sources.

7. The optical pickup of claim 2, wherein one of the first and second light sources emits the light having an infrared wavelength to record the information on and/or to reproduce the information from a CD family optical disc, and the other one of the first and second light sources emits light of a red wavelength to record the information on and/or to reproduce the information from a DVD family optical disc.

8. The optical pickup of claim 1, wherein the light source emits the light having an infrared wavelength or light of a red wavelength to record the information on and/or to reproduce the information from a CD family optical disc and/or a DVD family optical disc.

9. The optical pickup of claim 1,
wherein the light source comprises first and second light sources emitting the light having different wavelengths, and
wherein an area of an effective light receiving region of the front photodetector is smaller than a size of a light beam of the first and/or second light sources.

10. The optical pickup of claim 1,
wherein the light source comprises first and second light sources emitting light having different wavelengths, and
wherein a mirror plane of the plate beam splitter is coated so as not to reflect a first light beam emitted from the first light source to reduce an amount of the first light beam that is internally reflected in the plate beam splitter.

11. The optical pickup of claim 1,
wherein the light source comprises first and second light sources emitting light having different wavelengths, and
wherein a mirror plane of the plate beam splitter is coated so as not to reflect a second light beam emitted from the second light source to increase a transmittance of the second light beam at the second mirror plane.

12. The optical pickup of claim 11, wherein the second light beam emitted from the second light source and transmitted through the mirror plane, is internally reflected once at the first mirror plane and is received as an effective light by the front photodetector.

* * * * *

UNITED STATES PATENT AND TRADEMARK OFFICE
CERTIFICATE OF CORRECTION

PATENT NO.         : 7,251,209 B2
APPLICATION NO. : 10/424821
DATED                 : July 31, 2007
INVENTOR(S)       : Yong-jun Cho et al.

Page 1 of 1

It is certified that error appears in the above-identified patent and that said Letters Patent is hereby corrected as shown below:

Title Page, Column 1, Item 75 (Inventors), line 1, change "Gyeonggil-do" to --Gyeonggi-do--.

Title Page, Column 1, Item 75 (Inventors), line 3, change "Gyeonggil-do" to --Gyeonggi-do--.

Column 19, Line 57, change "cower" to --power--.

Signed and Sealed this

Eighteenth Day of December, 2007

JON W. DUDAS
*Director of the United States Patent and Trademark Office*